May 17, 1932.　　　J. W. LEWIN　　　1,858,997
SPIRAL FISH CABLE
Filed July 9, 1930
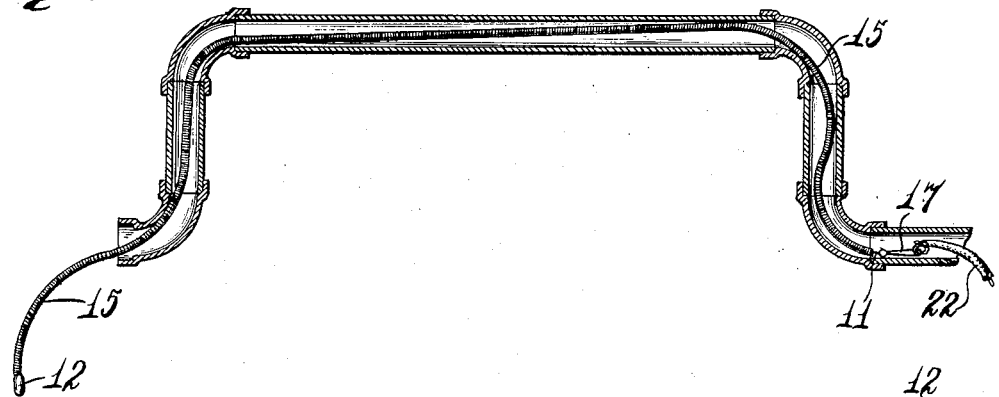
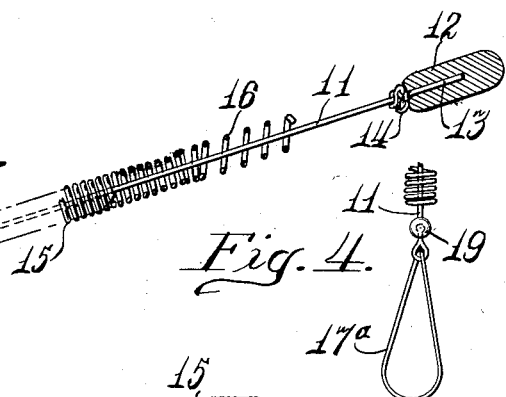
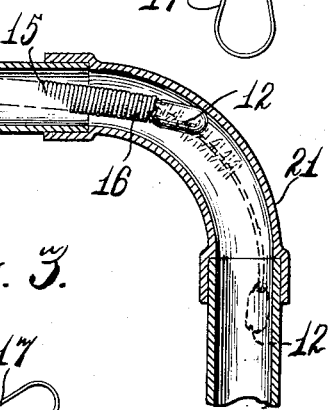
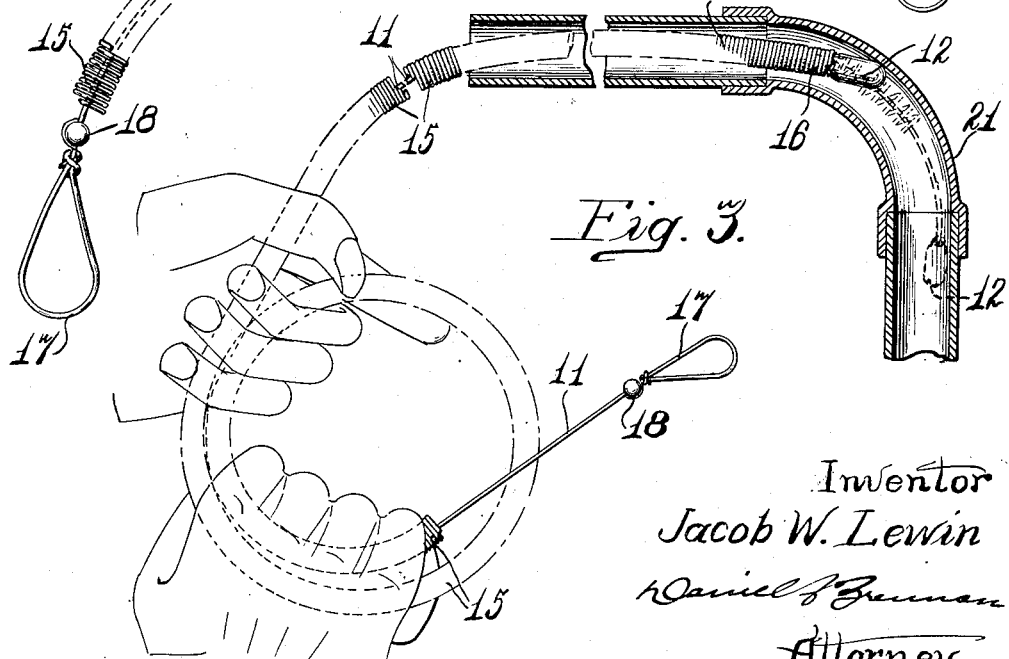
Inventor
Jacob W. Lewin
Attorney Patented May 17, 1932

1,858,997

UNITED STATES PATENT OFFICE

JACOB W. LEWIN, OF OAK PARK, ILLINOIS

SPIRAL FISH CABLE

Application filed July 9, 1930. Serial No. 466,767.

The invention relates to spiral fish cable and particularly to an improved fish wire, especially adapted for fishing electric wires through oval duct, or the like.

An object of the invention is to provide an improved spiral fish cable of the character referred to with means to effect any degree of flexibility or rigidity as may be required.

Another object is to provide an improved article of the character referred to of superior and durable construction adaptable for numerous uses in connection with electrical or plumbing work.

Another object is to provide an improved spiral fish cable with means for forcibly urging said line around sharp corners in conduits, ducts and other passageways having a small cross sectional area.

The foregoing and such other objects of the invention as will appear hereinafter as the description proceeds, will be more readily understood from a perusal of the following specification, reference being had to the accompanying drawings, in which:

Fig. 1 is a view of the improved spiral fish cable, shown partially inserted in a conduit, said conduit being shown in section.

Fig. 2 is a fragmentary elevational view of the improved spiral fish cable, a portion thereof being shown in section.

Fig. 3 is a view, showing the spiral fish cable held in position for forcible insertion around a bend.

Fig. 4 is a fragmentary elevational view of one end of the spiral fish cable, showing a modified construction.

The improved spiral fish cable is, as previously noted, particularly adapted for fishing wires through oval duct commonly employed in electrical work, wherein the cross sectional area of the duct, especially at elbows, is restricted to such an extent as to offer considerable resistance to the pushing of the known types of fish tapes therethrough. The improved spiral fish cable is of such construction that the amount of flexibility therein may be readily varied to suit the requirements arising under various conditions. The control of the amount of flexibility is especially advantageous when pushing the fish cable around bends or elbows because at such times additional rigidity is required.

As shown in the accompanying drawings, the spiral fish cable preferably includes a flexible steel or braided wire cable 11 having a head 12 on one end, preferably formed of elongated material rounded at both ends. The head 12 may be secured to the cable 11 in any approved manner; however, it is preferable to provide a longitudinal bore therein to receive the end 13 of said cable, extending beyond a knot 14. The knot 14 is adapted to abut the end of the head, as shown, for a purpose which will be more fully explained in detail later.

A flexible housing 15 encloses the cable 11. This housing preferably is formed of coiled spring steel wire to afford the utmost resiliency thereto, and it is substantially shorter than cable 11. The end of the housing adjacent the head 12 preferably is weakened, as at 16, to provide a spring-like end which forms a yieldable abutment for engagement for the knot 14 when the cable is drawn through the housing to bring the head thereagainst. The end of the cable 11 extending from the opposite end of the flexible housing 15, preferably is looped or otherwise provided with a wire securing means 17. A stop 18, which may be fixedly or adjustably secured on the cable 11, is provided adjacent the loop 17 to limit inward movement of the cable. If desired, a suitable swivel 19 (Fig. 4) may be provided on the end of the cable for securing the loop 17a thereto.

Prior to the fishing of wires through a conduit or duct, the spiral fish cable must be run through said conduit substantially in the manner shown in Figs. 1 and 3. To facilitate feeding of the device around a bend, especially in oval duct, it is necessary to render alternately the spiral fish cable flexible and rigid. This is effected by coiling the end of the spiral fish cable with the hands, in the manner substantially as shown in Fig. 3. Coiling of the spiral fish cable positively draws the knot 14, adjacent the end of the cable 11, tightly against the spring portion 16. This draws the spirals making up the housing 15 and the spring portion 16 tightly together and provides a substantially rigid-non-flexible structure. With the spiral fish cable held rolled, in the manner shown, the head 12 is urged against the bend or elbow 21 (see Fig. 3); and upon releasing the grip on the coiled end of the spiral fish cable, the spring portion 16, and the natural tendency of the coils making up the housing to spread, acts upon the head 12 and urges it further around the elbow. The housing 15 is then fed further into the duct, the cable 11 acting as a guide therefor until the spring portion 16 again strikes the knot 14. It can be readily understood that the most difficult bends can be passed by alternately coiling and releasing the end of the spiral fish cable.

After the spiral fish cable has been fed through the conduit, one or more electrical wires 22 are secured to the loop 17 in any approved manner, and the spiral fish cable is drawn through the duct by grasping the housing, adjacent the end having the head 12 thereon, and pulling. When pulling wires through a duct the knot 14 prevents the head 12 from being pulled off the cable 11 and the entire pull is absorbed, through the free end of the housing and the knot, by the cable 11. This construction relieves the housing of any tensile strain, thus it cannot become distorted and made useless.

The improved spiral fish cable may be employed for cleaning out plumbing fixtures, and the like, in that sufficient rigidity can be afforded the working end of said article, in the manner previously set forth, whereby said end may be forcibly urged through any material obstructing the passage through said fixtures. The improved spiral fish cable also is applicable for use in connection with well known round duct, but it is, as aforementioned, particularly adapted for, and is the only known wire fishing device capable of fishing wires through oval duct.

Although a preferred embodiment of the invention has been shown and described in detail, it is to be understood that certain changes may be made in its detail construction without departing from the spirit of the invention or the scope of the appended claims.

I claim:

1. An article of the class described comprising, in combination, a flexible housing, a cable extending through said housing, a fixed stop on one end of said cable, and an adjustable stop on the other end of said cable, said stops abutting the respective ends of said housing to prevent removal of said cable.

2. An article of the class described comprising, in combination, a housing, a cable extending through said housing, stops on said cable one adjacent each end of said housing, and one of said stops being adjustable whereby the distance between said stops may be varied to vary the longitudinal movement of the housing on said cable.

3. An article of the class described comprising, in combination, a housing, a cable extending through said housing, a knot adjacent one end of said cable adapted to abut the adjacent end of said housing, and an adjustable stop on said cable adjacent the other end of said housing to permit variance in the amount of longitudinal movement of said housing on said cable.

4. An article of the class described comprising, in combination, a flexible housing, a cable extending through said housing, a fixed stop on one end of said cable, an adjustable stop on the other end of said cable, said stops being adapted to abut the respective ends of said housing to prevent removal of said cable, and means on said cable extending beyond said adjustable stop to secure wires thereto.

In testimony whereof I affix my signature.

JACOB W. LEWIN.